United States Patent
Zambon et al.

(10) Patent No.: US 10,260,619 B2
(45) Date of Patent: Apr. 16, 2019

(54) CARRIER STRUCTURE FOR AN EPICYCLIC GEAR DRIVE, EPICYCLIC GEAR DRIVE AND TURBO ENGINE WITH AN EPICYCLIC GEAR DRIVE

(71) Applicant: Rolls-Royce Deutschland Ltd & Co KG, Blankenfelde-Mahlow (DE)

(72) Inventors: Elisa Zambon, Berlin (DE); Luca Mantovan, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 15/593,596

(22) Filed: May 12, 2017

(65) Prior Publication Data

US 2018/0003289 A1    Jan. 4, 2018

(30) Foreign Application Priority Data

Jun. 29, 2016    (EP) ..................................... 16176985

(51) Int. Cl.
     *F16H 57/08*    (2006.01)
     *F02C 7/36*    (2006.01)
     *F02K 3/06*    (2006.01)

(52) U.S. Cl.
     CPC .............. *F16H 57/082* (2013.01); *F02C 7/36* (2013.01); *F02K 3/06* (2013.01); *F05D 2260/40311* (2013.01); *Y02T 50/671* (2013.01)

(58) Field of Classification Search
None
See application file for complete search history.

(56) References Cited

U.S. PATENT DOCUMENTS

| | | | | |
|---|---|---|---|---|
| 4,983,152 A | * | 1/1991 | Kimberlin | ................. F16H 1/28 475/331 |
| 5,466,198 A | * | 11/1995 | McKibbin | ............... F02C 6/206 475/346 |
| 7,214,160 B2 | * | 5/2007 | Illerhaus | ............... F16H 57/082 475/331 |
| 8,348,803 B2 | | 1/2013 | Matsuoka et al. | |
| 2005/0026744 A1 | | 2/2005 | Illerhaus | |

FOREIGN PATENT DOCUMENTS

| | | |
|---|---|---|
| DE | 102014214328 A1 | 1/2016 |
| EP | 1186804 A1 * | 3/2002 |
| EP | 1186804 A1 | 3/2002 |

(Continued)

OTHER PUBLICATIONS

European Search Report dated Jan. 16, 2017 for counterpart European Application No. 16176985.6-1762.

(Continued)

*Primary Examiner* — Dirk Wright
(74) *Attorney, Agent, or Firm* — Shuttleworth & Ingersoll, PLC; Timothy J. Klima (57) ABSTRACT

A carrier structure for an epicyclic gear drive is provided. The carrier structure includes carrier elements connected with at least one planet gear and the first carrier element is connected with the second carrier element through at least two struts with the at least two struts having an inclination angle of more than 20° in the direction of a rotation around a rotation axis of the carrier structure.

14 Claims, 11 Drawing Sheets

(56) References Cited

FOREIGN PATENT DOCUMENTS

JP          H04105241 U     9/1992
WO          WO9429614 A1   12/1994

OTHER PUBLICATIONS

European Office Action dated Jan. 9, 2018 from counterpart EP App No. 16176985.6.
Inventor's Response dated May 8, 2018 to European Office Action dated Jan. 9, 2018 for counterpart EP App No. 16176985.6.
European Office Action dated Dec. 10, 2018 for counterpart European Patent Application No. 16176985.6.

* cited by examiner

CARRIER STRUCTURE FOR AN EPICYCLIC GEAR DRIVE, EPICYCLIC GEAR DRIVE AND TURBO ENGINE WITH AN EPICYCLIC GEAR DRIVE

REFERENCE TO RELATED APPLICATION

This application claims priority to European Patent Application No. 16 176 985.6 filed on Jun. 29, 2016, the entirety of which is incorporated by reference herein.

BACKGROUND

The invention relates to a carrier structure for an epicyclic gear drive, an epicyclic gear drive and a turbo engine.

Epicyclic gear drives are used in many applications such as in power gearboxes of aircraft engines or in automotive gear trains. Typically, the moving gears in an epicyclical gear drive are mounted to a carrier structure that is subjected to high loads resulting in considerable deformations. Therefore, resilient carrier structures are required. Carrier structures are e.g. described in U.S. Pat. No. 5,466,198 and U.S. Pat. No. 8,348,803 B2.

SUMMARY

This matter is addressed by a carrier structure with features as described herein.

The carrier structure for an epicyclic gear drive comprises carrier elements connected with at least one planet gear. The first carrier element being connected with the second carrier element through at least two struts having an inclination angle $\alpha$ of more than 20° in the direction of a rotation around a rotation axis of the carrier structure, in particular the inclination angle $\alpha$ is in the range between 35° and 55°, more in particular the inclination angle $\alpha$ is 45°. The inclination of the struts relative to the rotation axis introduces a restoring moment due to the centrifugal force that can be used to counterbalance tangential displacements in the carrier structure. The rotation is the rotation the gearbox is particularly designed for.

In an embodiment of a carrier structure having between three and ten struts, in particular between four and seven struts and in particular five struts, the stability of the structure and its flexibility are well balanced.

In a further embodiment, the struts are positioned evenly spaced around the circumference of the carrier elements.

When the struts are arc-shaped plates or rods with circular or elliptical cross-section and/or helically shaped beams they can be manufactured efficiently. The arc shape plates can naturally be formed by cutting out sections from a cylindrical casing of the gear drives.

In another embodiment, the carrier elements are distanced essentially in parallel and/or the carrier elements are essentially planar, in particular plate-shaped. The carrier elements connect the adjacent and/or co-planar ends of the pins of the gears.

It is also possible that the carrier elements and/or the struts comprise stiffening elements for extra strength.

One possible application for an embodiment of the carrier structure is a part of a turbo engine, in particular an aircraft turbo engine.

The issue is also addressed by an epicyclic power gearbox as described herein and a turbo engine as described herein.

BRIEF DESCRIPTION OF THE DRAWINGS

Embodiments of the invention are shown exemplary in the figures.

DETAILED DESCRIPTION

In the following embodiments of carrier structures 1 for epicyclic gear drives 100 are shown chiefly in connection with a planetary gear drive 100 in a turbofan engine 200 of an aircraft.

Figure 1:
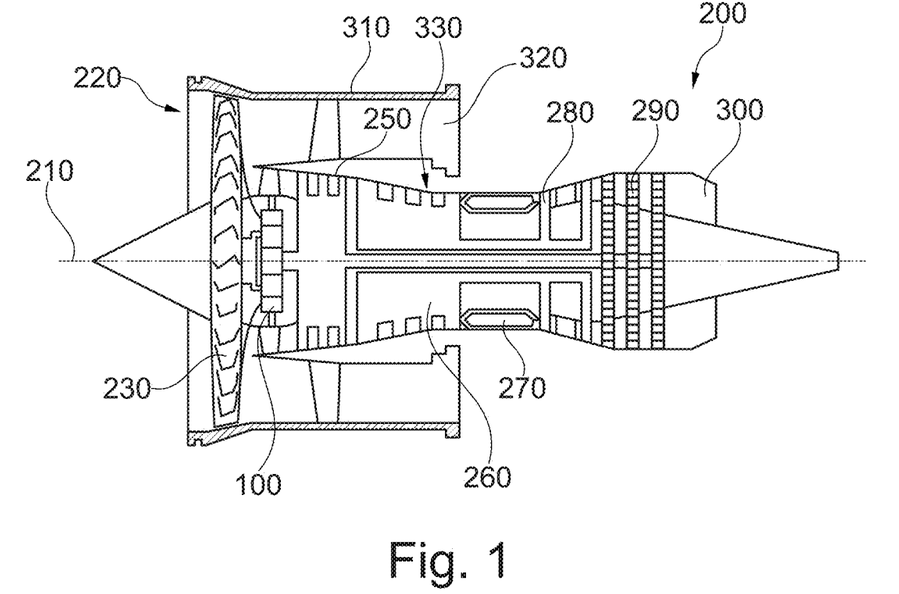
FIG. 1 schematically shows a turbofan engine with a power gearbox as an embodiment of a turbo engine with an epicyclic gear drive.

In FIG. 1 an aircraft engine 200 is shown schematically to illustrate the function of one embodiment of an epicyclic gear drive 100.

FIG. 1 shows a gas turbine engine in the form of a geared turbo fan engine 200. The engine includes a gas turbine engine, having a principal and rotational axis 210. The aircraft engine 200 further comprises, in axial flow series, an air intake 220, a propulsive fan 230 (which is here considered as a low pressure compressor), a gear train comprising the epicyclic power gear drive 100, a low pressure compressor 250, a high-pressure compressor 260, a combustor 270, a high-pressure turbine 280, a low-pressure turbine 290 and an exhaust nozzle 300. A fan case 310 generally defines the air intake 220.

The aircraft engine 200 works in the conventional manner so that air entering the intake 220 is accelerated by the fan 230 to produce two air flows: a first air flow is directed into the low pressure compressor 250 within a core engine 330 and a second air flow passes through a bypass duct 320 to provide the main propulsive thrust. The low- and high-pressure compressors 250, 260 in the core engine 330 compress the air flow directed into it for combustion in the combustor 270. The air not entering the bypass duct 320 is flowing through the core engine 330.

The resultant hot combustion products expand through, and drive the high- and low-pressure turbines 280, 290 before being exhausted through the nozzle 300 to provide additional propulsive thrust. The high pressure turbine 280 and low pressure turbines 290, respectively, drive the high pressure compressor 260 and the low pressure compressor 250/fan 230 via suitable shafting arrangements.

The fan 230 is drivably connected to a low pressure shaft via the gear train located drivable between the low pressure shaft and the fan 230. The gear train is a reduction gear train in that it is arranged to reduce the speed of the fan 230 relative to the speed of the low pressure turbine 290 and low pressure compressor 250. Such an arrangement with a power gearbox comprising an epicyclic gear drive 100 allows for a higher speed and a more efficient low pressure turbine 290, and a slow spinning larger fan 230 which can provide a higher bypass ratio. This freedom allows the speed of the fan 230 and low pressure turbine 290 to be independently optimized, but at a potential weight penalty resulting from the gear train.

The gear train comprises here an epicyclical gear drive 100 arranged in a planetary configuration.

As shown in FIG. 1, the planetary power gear drive 100 provides a favorable gear ratio for large civil gas turbine engines. It will be appreciated that some applications include differential or compound arrangements for the gear drive.

Other aircraft turbine engines 200 to which the present disclosure may be applied may have alternative configurations. By way of example, such engines may have an alternative number of interconnecting shafts (e.g. three) and/or an alternative number of compressors and/or turbines.

Figure 2:
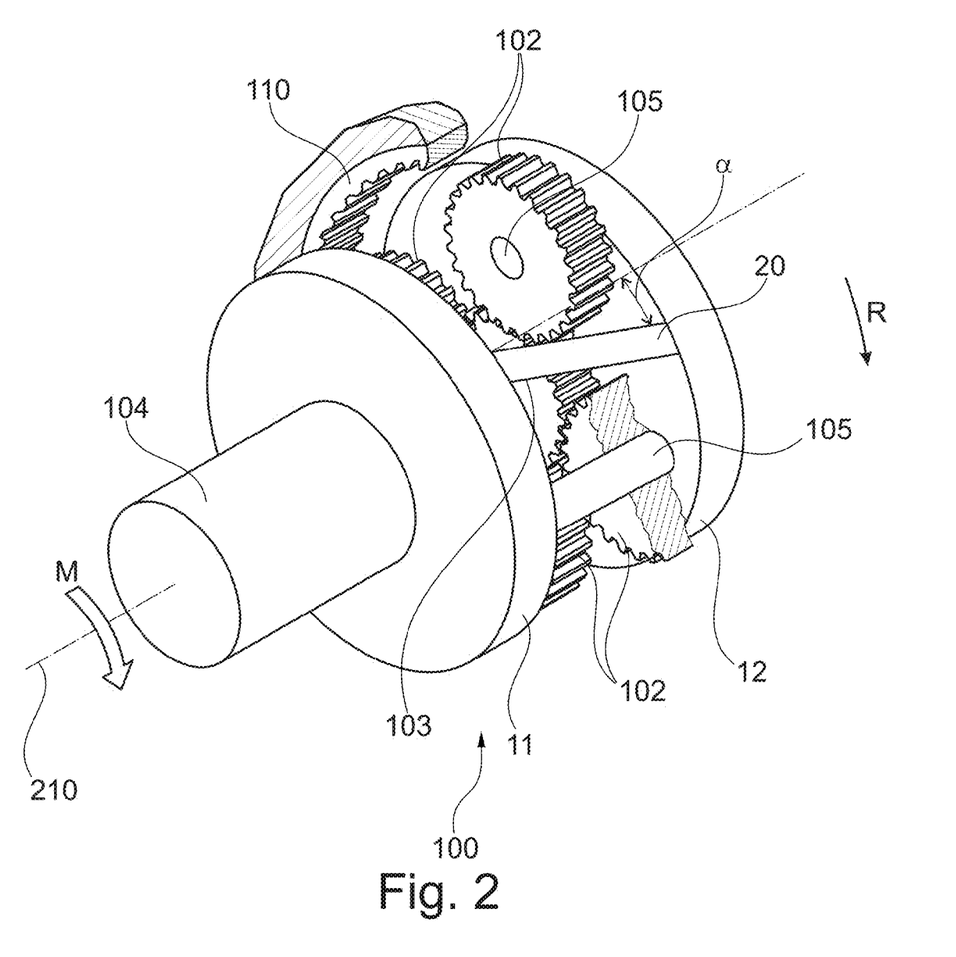
FIG. 2 schematically shows a perspective view of an embodiment of a carrier structure in a power gearbox.

An embodiment of a planetary gear drive 100 is shown in more detail in FIG. 2. The geared drive system includes a ring gear 110, a sun gear 103, planet gears 102, a planet carrier structure 1 (only partially shown here, described in more detail below) with two carrier elements 11, 12 and a torque frame 104.

The planet carrier structure 1 comprises a forward first carrier element 11 and a rear second carrier element 12. Both carrier elements 11, 12 here essentially have the shape of plates which are essentially positioned in parallel. In alternative embodiments the carrier elements 11, 12 comprise a frame-like structure.

Each planet gear 102 is rotatably supported in the carrier structure 1 by a journal 105, each journal 105 having a central axis which is the axis of rotation of the associated planet gear 102. For clarity, only one journal 105 is shown in FIG. 2. Similarly, the fan 230 is not shown; instead, the torque M is indicated that is imposed on the gear drive 100.

The low pressure turbine 290 (see FIG. 1) rotates the sun gear 103 around the axis 210, the carrier structure 1, and the torque frame 104 in direction R (see indicated arrow), in the direction of the output torque M.

For stabilizing the carrier structure 1, the two carrier elements 11, 12 are connected with struts 20. The struts are arc-shaped plates, which is due to the cut-out from the cylindrical casing of the carrier structure.

In FIG. 2, only one strut 20 is shown for reasons of clarity. The struts 20 have an inclination angle α of more than 0° against the rotation axis 210, i.e. the rotation axis 210 of the turbo engine 200 and the carrier structure 1. The inclination angle α is in the direction of the moment M which forms the load on the carrier structure 1 or a load transmitted by the carrier structure 1.

Especially in turbofan engines as shown in FIG. 1, the forces and moments operating on the gear drive 100 are considerable. Since the gear drive 100 is subjected to high rotation speeds and the radial extension of the gear drive is considerable, the gear drive 100 is also subjected to high centrifugal forces $F_c$ (see e.g. FIGS. 7a, 8). The moments and forces acting on the gear drive 100 result in misalignments that need to be limited in operation. For example the maximum radial misalignment should be smaller than 0.1 mm, the maximal tangential misalignment should be smaller than 0.5 mrad.

It was found that a lightweight and structurally stable carrier structure 1 can be built if the two carrier elements 11, 12 for the planet gears 102 are connected by at least two struts 20, wherein the at least two struts 20 are inclined by an inclination angle α against the rotation axis 210. The inclination angle α can be more than 20°, in particular the inclination angle α is 45°. The inclination angle α will be smaller than 90°.

The inclination angle α of the strut 20 between the casing elements 11, 12 allows for balancing of forces and moments to minimize the misalignments caused by the loads on the gear drive 100 as will be described below. In total, a carrier structure 1 with an improved stiffness is created by using inclined struts 20 in particular.

Figure 3:
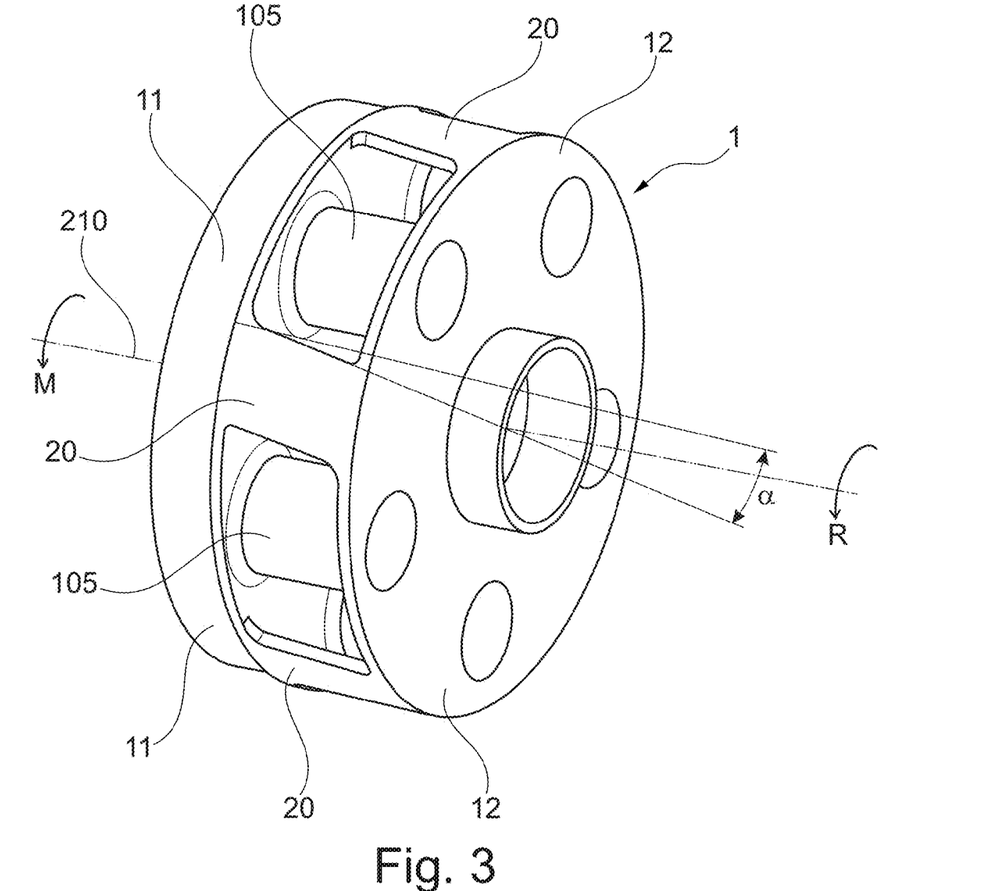
FIG. 3 schematically shows an embodiment of a carrier structure with inclined struts (inclination angle $\alpha$=9°).
Figure 4:
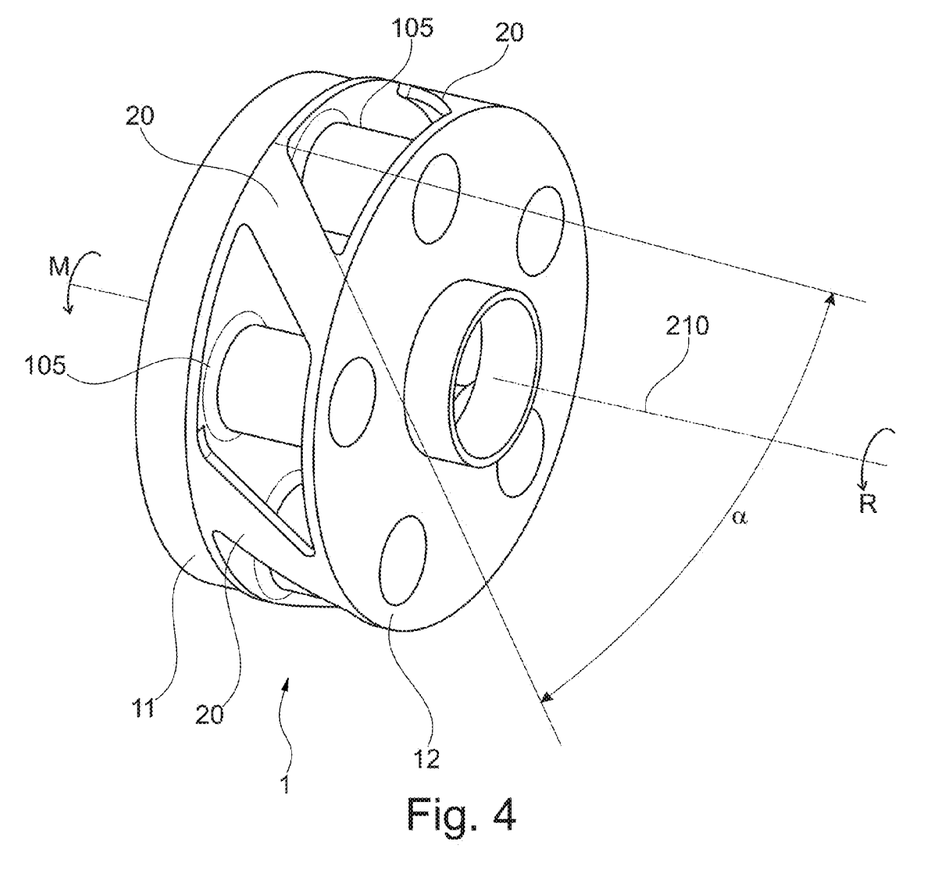
FIG. 4 schematically shows an embodiment of a carrier structure with inclined struts (inclination angle $\alpha$=45°).

In FIGS. 3 and 4 two different carrier structures 1 with each two carrier elements 11, 12 are shown. The carrier elements 11, 12 are here designed as plates and are positioned in parallel to each other. The five planet gears 102 are not shown in FIGS. 3 and 4 for the sake of clarity. Instead, two of the five journals 105 for the planet gears 102 are shown.

The carrier elements 11, 12 are connected by five struts 20 of which three are visible in FIGS. 3 and 4. The struts 20 are positioned around the circumference of the carrier structure 1. The five struts 20 are here regularly spaced 60° apart.

In other embodiments, two to seven struts 20—depending on the number of planet gears 102—can be placed regularly spaced apart around the circumference of the carrier elements 11, 12.

The cross-section of the struts 20 is arc-shaped with a relatively small radial thickness; the struts 20 are relatively slim. In alternative embodiments, the struts 20 are rod-shaped with circular or elliptical cross-sections.

In the embodiment of FIG. 3 the struts 20 are angled by 9° against the rotational axis 210.

In the embodiment of FIG. 4, the struts 20 are angled by 45° against the rotational axis 210.

In both cases the inclination angle α is shown against a line parallel to the rotational axis 210.

The two embodiments of carrier structures 1 shown in FIGS. 3 and 4 are relatively light weight because only certain sections are filled by casing material, i.e. the arc-shaped struts 20. At the same time, the struts 20 provide stability with reduced misalignments to the complete carrier structure 1, in particular under dynamic loads, i.e. under the moments and forces during the operation of the gear drive 100. This will be explained in more detail in FIGS. 7 to 8.

Figure 5:
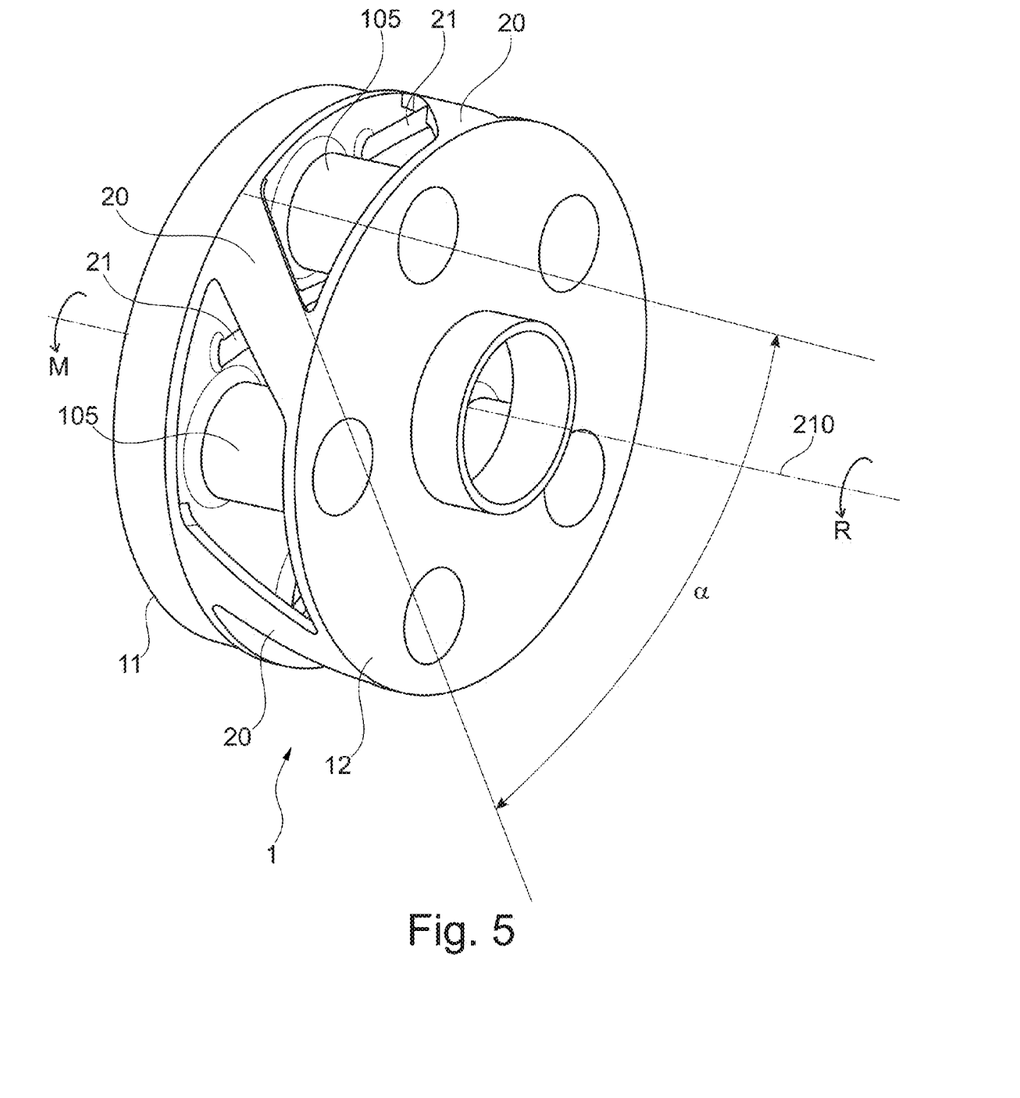
FIG. 5 schematically shows an embodiment of a carrier structure with inclined struts (inclination angle $\alpha$=45°) and enforcement ribs.
Figure 5A:
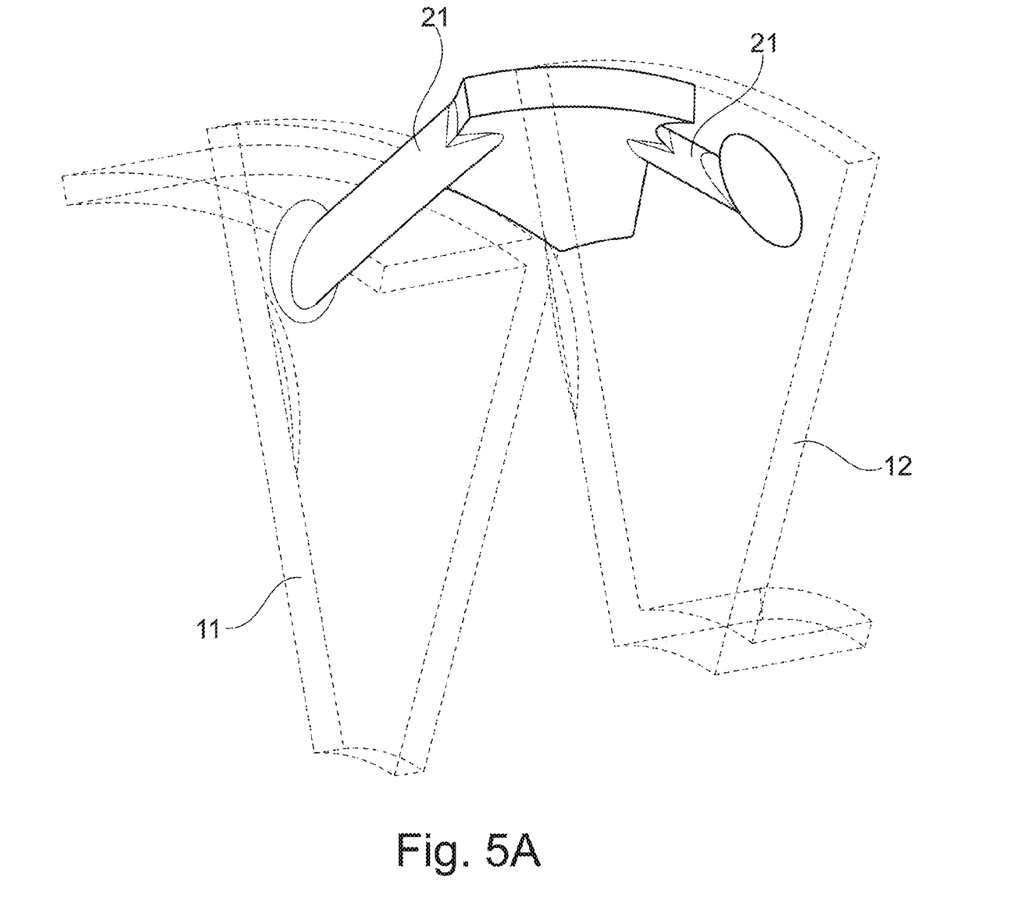
FIG. 5A a detail of the reinforcement ribs.

In FIG. 5 a variation of the embodiment depicted in FIG. 4 is shown. The arc-shaped struts 20 are positioned with an inclination angle α=45° against the rotation axis 210 around the outer rim of the circumference of the carrier structure 1. In addition, stiffening elements 21 are positioned between the carrier elements 11, 12 radially inwards. The details of the positioning of the stiffening elements 21 in the form of struts is shown in FIG. 5A.

Figure 6:
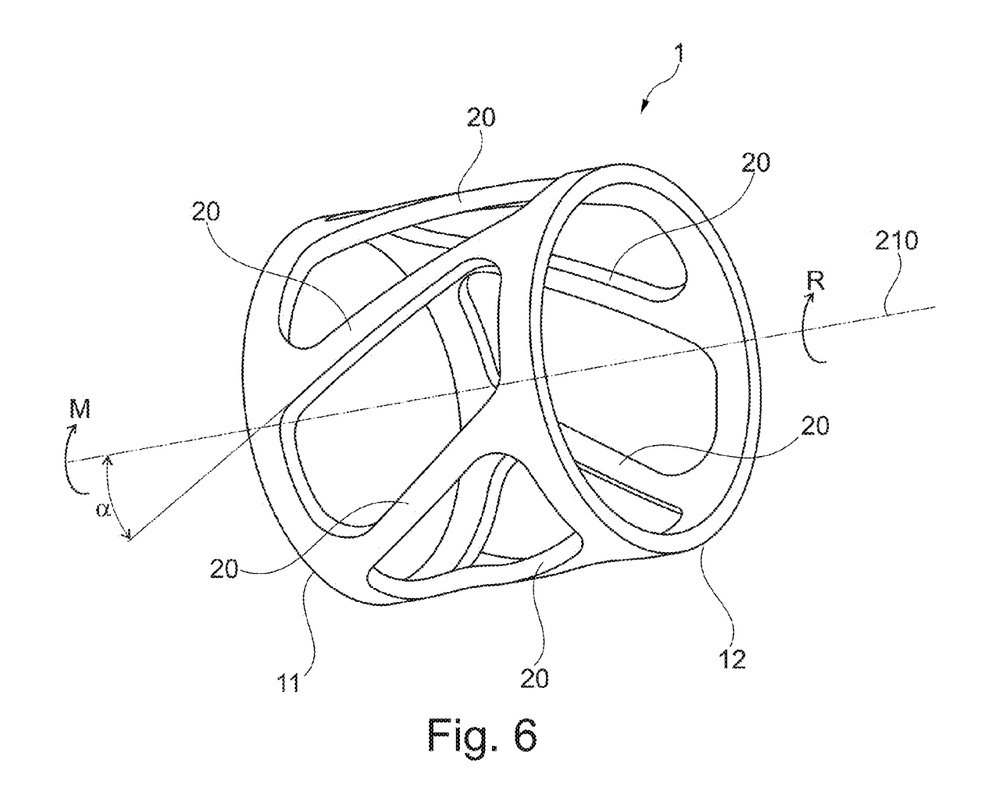
FIG. 6 a computer generated model of an embodiment of a carrier structure with inclined struts (inclination angle $\alpha$=45°).

In FIG. 6 a computer generated model of an embodiment of a carrier structure 1 is shown. The two carrier elements 11, 12 (here modelled as rings) are connected in axial direction through six inclined struts 20. The inclination angle α against the rotation axis 210 is 30°. The struts are—compared against the embodiment e.g. of FIG. 4—azimuthally smaller, i.e. the struts are rather slender. The cross-section of the struts 20 is essentially rectangular.

This simplified model shows the general structure of the inclined struts 20 of the carrier structure 1 that can be used in very different embodiments and configurations. The key idea is here that the carrier elements 11, 12 that are positioned in parallel planes are connected through struts 20 in an angled structure. The person skilled in the art realizes that this structure can e.g. be modified by altering the number of struts 20 and/or the inclination angle α. The structural model also shows the symmetric spacing (and even spacing) of the struts around the outer circumference of the circular carrier elements.

Figure 7A:
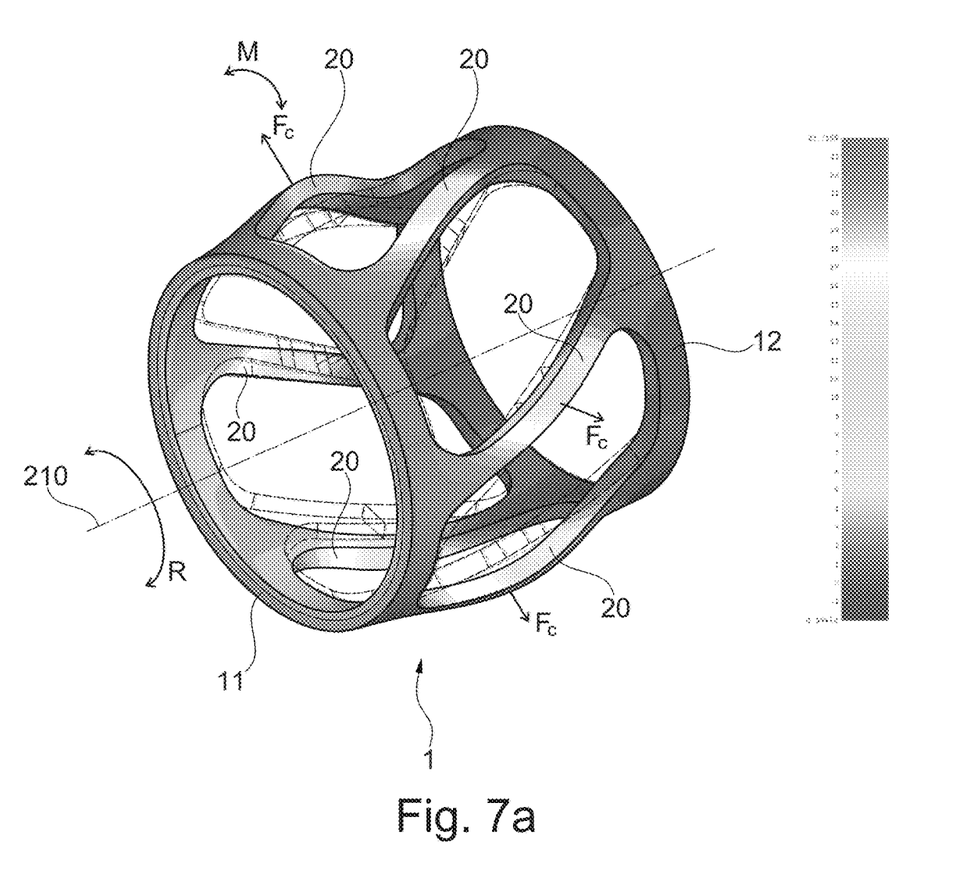
FIG. 7a a computer generated model of an embodiment of a carrier structure under centrifugal forces.
Figure 7B:
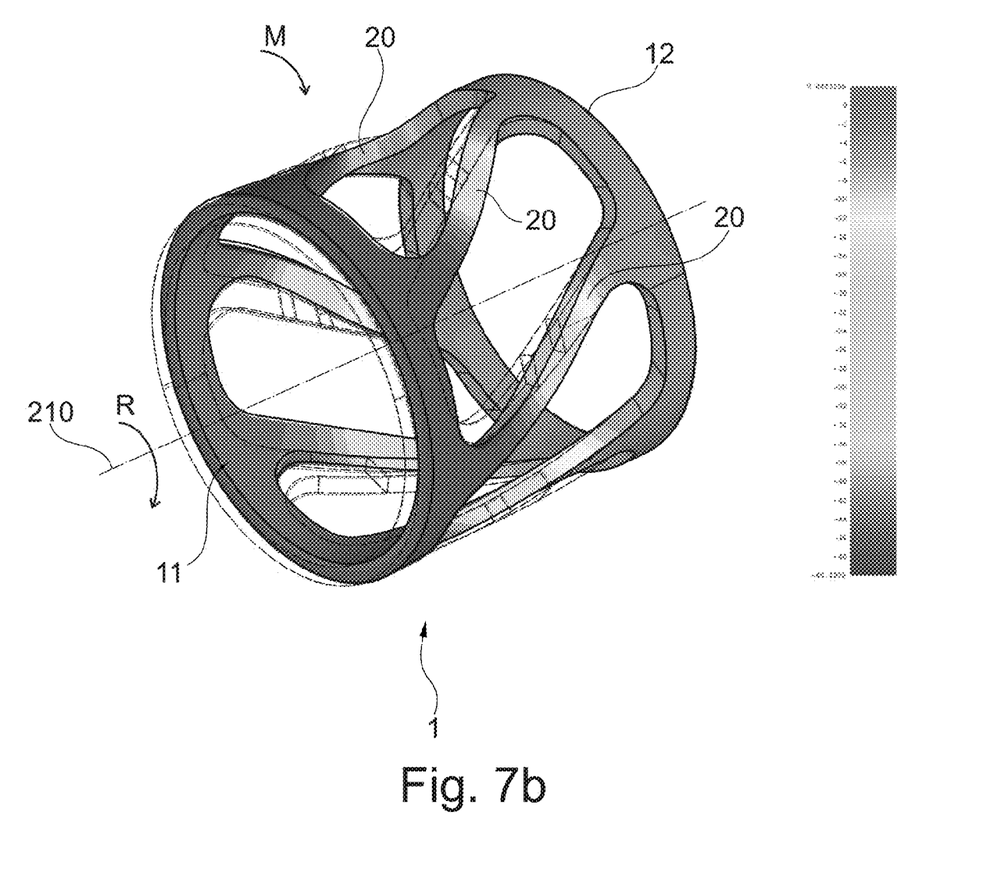
FIG. 7b a computer generated model of the embodiment shown in FIG. 7a under torsional load.
Figure 7C:
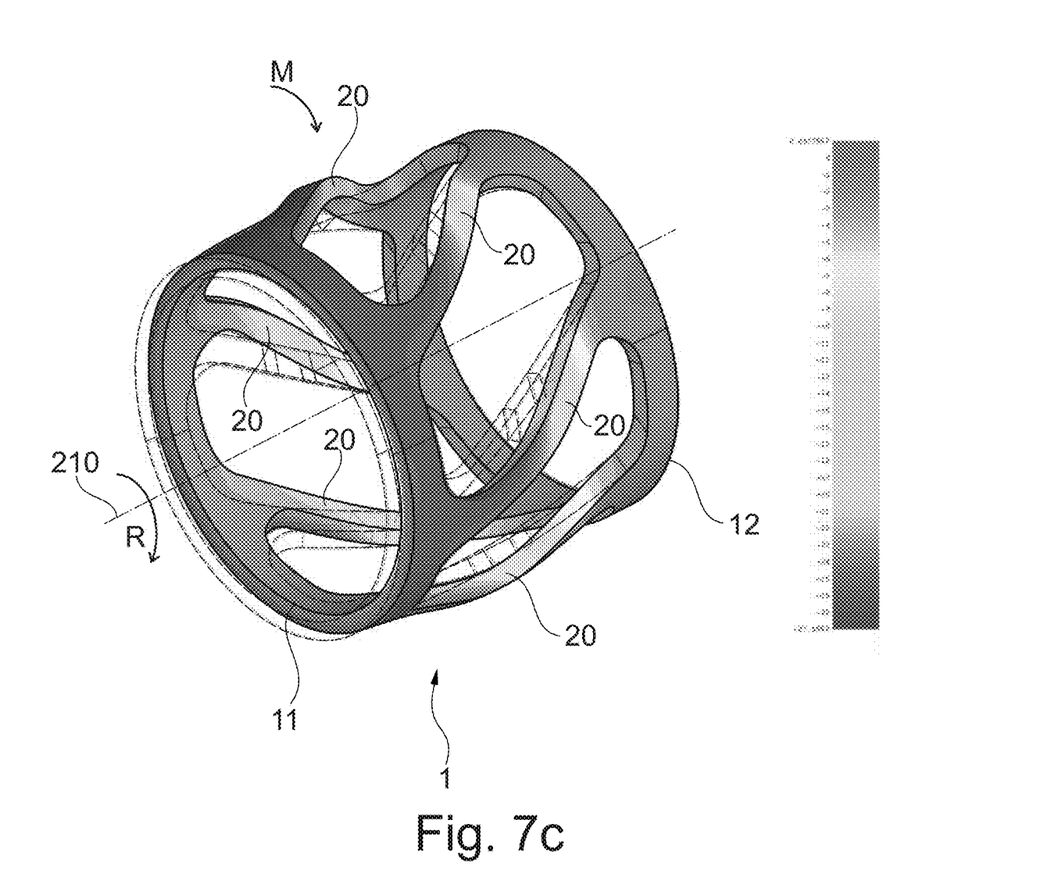
FIG. 7c a computer generated model of the embodiment shown in FIGS. 7a and 7b with torsional and centrifugal loads counterbalancing each-other.

FIGS. 7a to 7c show computer generated models like the one shown in FIG. 6 under different loads. The distortions are exaggerated to show the principal mechanical effects in the carrier structure 1.

Like in the model shown in FIG. 6, there are six struts 20 symmetrically and evenly spaced around the outer rim of the circumference of the carrier elements 11, 12, so that reference can be made to the description above.

In FIG. 7a loads in the carrier structure 1 under rotation R around the rotation axis 210 are modelled subject to the boundary conditions that the first carrier element 11 is considered fixed and the second carrier element 12 is considered flexible relative to the first carrier element 11. The external diameter of the carrier structure 11 in this example is 200 mm, the centrifugal force on each strut is 280 N resulting in a displacement of 0.024 mm.

The centrifugal force $F_c$ (see arrows in FIG. 7a) acts on the struts 20 and shows the resulting circumferential displacements for the first carrier element 11. It can be seen that the struts 20 are displaced radially outwards due to the centrifugal forces $F_c$. The maximum circular displacement at the first carrier element 11 is about 0,024 mm.

In FIG. 7b loads on the carrier structure 1 due to moments in direction M (here 380 Nm) are modelled. The six struts 20 are distorted due to the moment M. The maximal displacement is at the first carrier element 11 about −0,050 mm, i.e. the displacement is in the opposite direction of the displacement solely under the centrifugal forces $F_c$ shown in FIG. 7a.

When the configuration as shown in FIG. 7b is subjected a rotation (as shown in FIG. 7a) the loads due to the centrifugal forces $F_c$ and the distortion due to the moment M are superimposed resulting in a reduction of the displacements shown under the moment M (FIG. 7b) alone. The largest distortion is only −0,026 mm which is about 50% of the displacement due to the moment M (as shown in FIG. 7b). The centrifugal forces $F_c$ helps to recover a considerable amount of the circumferential distortion.

This counterbalancing or restoring effect is mainly due to the use of the inclined struts 20 because they apply some restoring moment by using the centrifugal forces $F_c$ to the struts 20. This is explained in the free body diagram of an inclined strut shown in FIG. 8.

Figure 8:
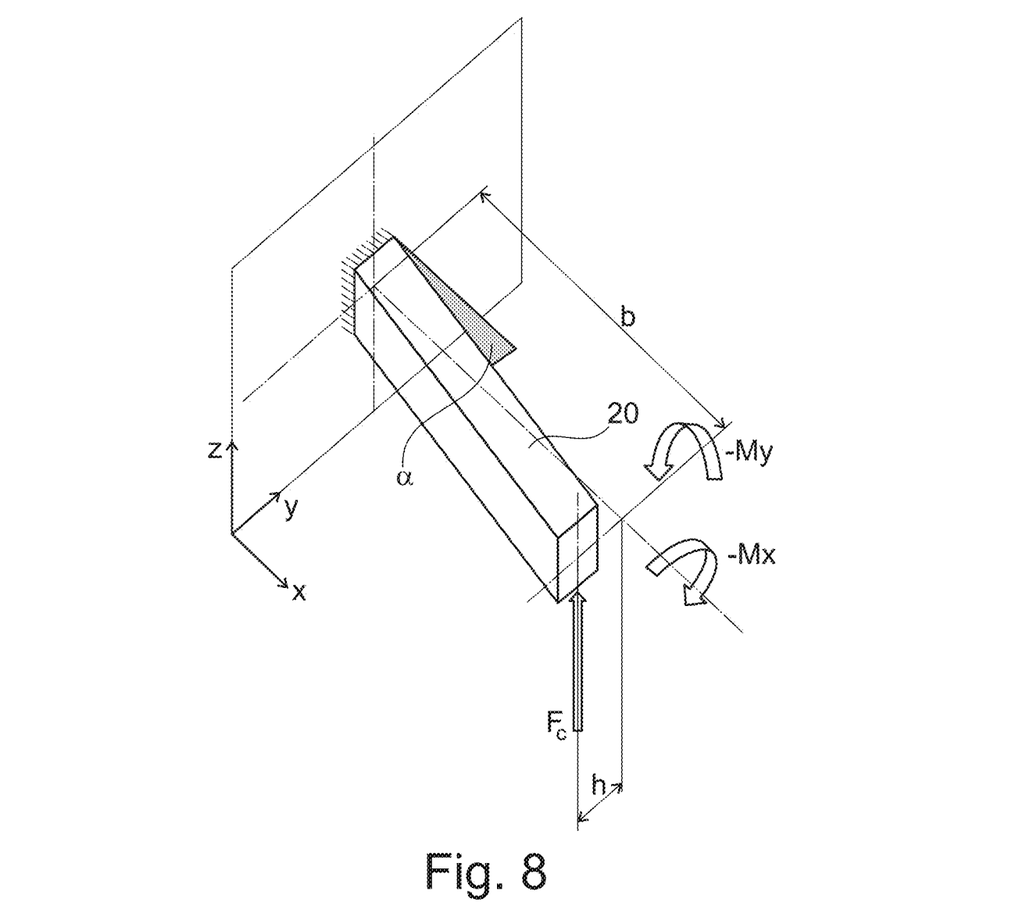
FIG. 8 free body diagram of an inclined strut.

In FIG. 8, one strut 20 is modelled as a beam with a length b. The beam is rigidly fixed under the inclination angle α to a wall in the z-y plane (see coordinate system in FIG. 8). Due moments shown in FIG. 7b are a reaction of the applied centrifugal force $F_C$, the strut 20 (and the complete carrier structure 1 as shown in FIG. 7b) is distorted.

The distortion is counterbalanced—at least partially—by the effect of the centrifugal force $F_c$ acting in the positive z-direction. The lever of the centrifugal force has the length h, i.e. the deflection of the beam. In the x-y plane moments $M_x=-F_c h$ and $M_y=-F_c b$ act on the beam turning it and—at least partially—counteracting on the loads, reducing the displacements shown in FIG. 7b. This shows, why using struts 20 under an inclination angle α>0° has a beneficial effect on the mechanical behavior of the carrier structure 1 under load.

Theoretically the higher the angle α (<90°) the higher the moment $M_x$. Though a is limited by the planets number, their dimensions and distance between carrier elements 11, 12.

So far, the embodiments for the carrier structure 1 were described in the context of a planetary gear drive 100 as an example of an epicyclic gear drive. It is also possible to use embodiments of the carrier structure 1 in connection with a compound planetary gear drive. Such compound gear drive can comprise a meshed-planet (there are at least two more planets in mesh with each other in each planet train), a stepped-planet (there exists a shaft connection between two planets in each planet train), and multi-stage structures (the system contains two or more planet sets).

The embodiments also refer to power gearboxes 100 in aircraft engines 200. The person skilled in the art will realize that the concept of inclined struts 20 in carrier structures 1 can be applied to other designs of gear drives and other applications as well.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

LIST OF REFERENCE NUMBERS 1 carrier structure
11 first carrier element
12 second carrier element
20 strut in carrier structure
21 stiffening element
100 epicyclic gear drive, planetary gear drive
102 planet gear
103 sun gear
104 torque frame
105 journal for planet gear
110 ring gear
200 aircraft turbo engine
210 rotation axis of turbo engine
220 air intake
230 fan
250 low pressure compressor
260 high pressure compressor
270 combustor
280 high pressure turbine
290 low pressure turbine
300 exhaust nozzle
310 fan case
320 bypass duct
330 core of aircraft turbo engine
α a inclination angle
b length of beam (strut)
$F_c$ centrifugal force
h lever of beam (strut)
M Moment (Torsion)
R rotation

The invention claimed is:

1. A carrier structure for an epicyclic gear drive, comprising:
   at least one planet gear;
   at least two struts;
   a plurality of carrier elements connected with the at least one planet gear, the plurality of carrier elements including a first carrier element connected with a second carrier element through the at least two struts, with the at least two struts having an inclination angle of more than 0° and less than 90° in a direction of a rotation around a rotation axis of the carrier structure;
   wherein the at least two struts are at least one chosen from arc-shaped plates, rods with circular or elliptical cross-section and helically shaped beams;
   wherein one of the plurality of carrier elements is mechanically stiffer than another of the plurality of carrier elements.

2. The carrier structure according to claim 1, wherein the inclination angle is in a range between 35° and 55°.

3. The carrier structure according to claim 2, wherein the inclination angle is 45°.

4. The carrier structure according to claim 1, wherein the at least two struts is between three and ten struts.

5. The carrier structure according to claim 4, wherein the at least two struts is five struts.

6. The carrier structure according to claim 1, wherein the at least two struts are positioned evenly spaced around a circumference of the plurality of carrier elements.

7. The carrier structures according to claim 1, wherein the at least two struts are positioned between cut-outs of a casing of the carrier structure.

8. The carrier structure according to claim 1, wherein the plurality of carrier elements are at least one chosen from distanced in parallel and planar.

9. The carrier structure according to claim 8, wherein the plurality of carrier elements are plate-shaped.

10. The carrier structure according to claim 1, wherein at least one chosen from the plurality of carrier elements and the at least two struts comprise stiffening elements.

11. The carrier structure according to claim 1, wherein the carrier structure is part of a turbo engine.

12. A power gearbox including the carrier structure according to claim 1.

13. A turbo engine including the power gearbox according to claim 12.

14. The carrier structure according to claim 1, wherein the inclination angle is greater than 20°.

* * * * *